United States Patent
Park et al.

(10) Patent No.: US 11,637,275 B2
(45) Date of Patent: Apr. 25, 2023

(54) POSITIVE ELECTRODE MATERIAL FOR LITHIUM SECONDARY BATTERY, METHOD OF PREPARING THE SAME, AND POSITIVE ELECTRODE FOR LITHIUM SECONDARY BATTERY AND LITHIUM SECONDARY BATTERY WHICH INCLUDE THE POSITIVE ELECTRODE MATERIAL

(71) Applicant: LG Chem, Ltd., Seoul (KR)

(72) Inventors: Young Uk Park, Daejeon (KR); Tae Gu Yoo, Daejeon (KR); Jin Tae Hwang, Daejeon (KR); Wang Mo Jung, Daejeon (KR); Sung Bin Park, Daejeon (KR)

(73) Assignee: LG Energy Solution, Ltd.

( * ) Notice: Subject to any disclaimer, the term of this patent is extended or adjusted under 35 U.S.C. 154(b) by 287 days.

(21) Appl. No.: 16/633,455

(22) PCT Filed: Sep. 19, 2018

(86) PCT No.: PCT/KR2018/011070
§ 371 (c)(1),
(2) Date: Jan. 23, 2020

(87) PCT Pub. No.: WO2019/059647
PCT Pub. Date: Mar. 28, 2019

(65) Prior Publication Data
US 2020/0212423 A1    Jul. 2, 2020

(30) Foreign Application Priority Data
Sep. 19, 2017    (KR) ........................ 10-2017-0120679

(51) Int. Cl.
*H01M 4/131* (2010.01)
*H01M 4/04* (2006.01)
(Continued)

(52) U.S. Cl.
CPC ......... *H01M 4/131* (2013.01); *H01M 4/0435* (2013.01); *H01M 4/364* (2013.01);
(Continued)

(58) Field of Classification Search
CPC .... H01M 4/131; H01M 4/0435; H01M 4/364; H01M 4/505; H01M 4/525; H01M 4/663; H01M 2004/021; H01M 2004/028
See application file for complete search history.

(56) References Cited

U.S. PATENT DOCUMENTS

| 9,478,799 B2 | 10/2016 | Lee et al. |
| 2005/0266315 A1 | 12/2005 | Sato et al. |

(Continued)

FOREIGN PATENT DOCUMENTS

| CN | 103155229 A | 6/2013 |
| CN | 104134790 A | 11/2014 |

(Continued)

OTHER PUBLICATIONS

Ding Wang et al., "Role of zirconium dopant on the structure and high voltage electrochemical performances of LiNi0.5Co0.2Mn0.3O2 cathode materials for lithium ion batteries", Electrochimica Acta, 2016, vol. 188, pp. 48-56.

(Continued)

*Primary Examiner* — Matthew J Merkling
(74) *Attorney, Agent, or Firm* — Lerner David LLP

(57) ABSTRACT

The present disclosure relates to a positive electrode material which includes a first positive electrode active material and a second positive electrode active material, wherein the second positive electrode active material has an electrical conductivity of 0.1 μS/cm to 150 μS/cm, which is measured after the second positive electrode active material is prepared in the form of a pellet by compressing the second positive electrode active material at a rolling load of 400 kgf (Continued)

to 2,000 kgf, a method of preparing the positive electrode material, and a positive electrode for a lithium secondary battery and a lithium secondary battery which include the positive electrode material.

10 Claims, 3 Drawing Sheets

(51) Int. Cl.
    *H01M 4/36*         (2006.01)
    *H01M 4/505*       (2010.01)
    *H01M 4/525*       (2010.01)
    *H01M 4/66*         (2006.01)
    *H01M 10/0525*    (2010.01)
    *H01M 4/02*         (2006.01)

(52) U.S. Cl.
    CPC ........... *H01M 4/505* (2013.01); *H01M 4/525* (2013.01); *H01M 4/663* (2013.01); *H01M 10/0525* (2013.01); *H01M 2004/021* (2013.01); *H01M 2004/028* (2013.01)

(56) References Cited

U.S. PATENT DOCUMENTS

| | | | |
|---|---|---|---|
| 2006/0105240 A1 | 5/2006 | Kinoshita et al. | |
| 2006/0257745 A1 | 11/2006 | Choi et al. | |
| 2007/0037056 A1 | 2/2007 | Kitao et al. | |
| 2011/0053004 A1 | 3/2011 | Saruwatari et al. | |
| 2012/0070743 A1 | 3/2012 | Kwon et al. | |
| 2013/0224586 A1 | 8/2013 | Nagai et al. | |
| 2014/0050985 A1 | 2/2014 | Lee et al. | |
| 2014/0113198 A1 | 4/2014 | Han et al. | |
| 2015/0162598 A1 | 6/2015 | Kim et al. | |
| 2016/0172671 A1 | 6/2016 | Yoo et al. | |
| 2016/0190585 A1* | 6/2016 | Yoon | H01M 4/364 429/231.5 |
| 2016/0211517 A1* | 7/2016 | Beck | H01M 4/505 |
| 2016/0322633 A1 | 11/2016 | Kim et al. | |
| 2017/0040606 A1 | 2/2017 | Nishide et al. | |
| 2017/0069907 A1* | 3/2017 | Zhu | H01M 4/483 |
| 2017/0179486 A1 | 6/2017 | Saruwatari et al. | |
| 2018/0026268 A1* | 1/2018 | Kim | H01M 4/525 429/223 |
| 2018/0062179 A1 | 3/2018 | Wada et al. | |
| 2019/0051899 A1* | 2/2019 | Xia | H01M 4/505 |
| 2019/0060878 A1* | 2/2019 | Kang | C01B 32/162 |

FOREIGN PATENT DOCUMENTS

| | | |
|---|---|---|
| CN | 105849952 A | 8/2016 |
| EP | 2882014 A1 | 6/2015 |
| JP | 2001357841 A | 12/2001 |
| JP | 2008234872 A | 10/2008 |
| JP | 2011071103 A | 4/2011 |
| JP | 4841133 B2 | 12/2011 |
| JP | 5132048 B2 | 1/2013 |
| JP | 2015170555 A | 9/2015 |
| JP | 2016160127 A | 9/2016 |
| KR | 20060091486 A | 8/2006 |
| KR | 20120030774 A | 3/2012 |
| KR | 20120130715 A | 12/2012 |
| KR | 20140018685 A | 2/2014 |
| KR | 20140024587 A | 3/2014 |
| KR | 101503436 B1 | 3/2015 |
| KR | 101551520 B1 | 9/2015 |
| KR | 20160073178 A | 6/2016 |
| KR | 20160080244 A | 7/2016 |
| KR | 20160127991 A | 11/2016 |
| WO | 2016068286 A1 | 5/2016 |
| WO | 2016181952 A1 | 11/2016 |

OTHER PUBLICATIONS

Extended European Search Report including Written Opinion for Application No. EP18859842.9 dated Jul. 7, 2020, 8 pgs.
International Search Report for Application No. PCT/KR2018/011070 dated Mar. 22, 2019.

* cited by examiner

POSITIVE ELECTRODE MATERIAL FOR LITHIUM SECONDARY BATTERY, METHOD OF PREPARING THE SAME, AND POSITIVE ELECTRODE FOR LITHIUM SECONDARY BATTERY AND LITHIUM SECONDARY BATTERY WHICH INCLUDE THE POSITIVE ELECTRODE MATERIAL

CROSS-REFERENCE TO RELATED APPLICATIONS

The present application is a national phase entry under 35 U.S.C. § 371 of International Application No. PCT/KR2018/011070 filed Sep. 19, 2018, the disclosure of which is incorporated herein in its entirety by reference, which claims the benefit of Korean Patent Application No. 10-2017-0120679, filed on Sep. 19, 2017, in the Korean Intellectual Property Office, the disclosure of which is incorporated herein in its entirety by reference.

TECHNICAL FIELD

The present disclosure relates to a positive electrode material for a lithium secondary battery, a method of preparing the positive electrode material, a positive electrode for a lithium secondary battery including the positive electrode material, and a lithium secondary battery including the positive electrode.

BACKGROUND ART

Demand for secondary batteries as an energy source has been significantly increased as technology development and demand with respect to mobile devices have increased. Among these secondary batteries, lithium secondary batteries having high energy density, high voltage, long cycle life, and low self-discharging rate have been commercialized and widely used.

In recent years, research to increase capacity of the lithium secondary battery and reduce charge/discharge time has been actively conducted.

Lithium transition metal composite oxides have been used as a positive electrode active material of a conventional lithium secondary battery, and, among these oxides, since a lithium cobalt composite metal oxide, such as $LiCoO_2$, may have a high operating voltage and may react even at a high current due to effective deintercalation of lithium ions during fast charging, it may provide a positive electrode having excellent charge efficiency. However, since the $LiCoO_2$ has poor thermal properties due to an unstable crystal structure caused by the lithium deintercalation and, particularly, cobalt is expensive, there is a limitation in using a large amount of the $LiCoO_2$ as a power source for applications such as electric vehicles.

Recently, attempts have been made to increase cost competitiveness of a positive electrode material by mixing a lithium cobalt composite metal oxide, a low-cost lithium nickel cobalt manganese oxide, and $Li(Ni_aCo_bMn_c)O_2$ (where a, b, and c are each independently an atomic fraction of oxide composition elements, wherein 0<a<1, 0<b<1, and 0<c<1).

However, with respect to a secondary battery in which the positive electrode material including the lithium cobalt composite metal oxide and the lithium nickel cobalt manganese oxide is used, there is a limitation in that life performance is degraded while the lithium nickel cobalt manganese oxide is overloaded in a section where the lithium nickel cobalt manganese oxide operates alone at an early stage of charging during the fast charging, and this limitation occurs more frequently particularly when a high content of nickel is included.

Thus, there is a need to develop a positive electrode material which may improve life characteristics during fast charging by reducing the overload of the lithium nickel cobalt manganese oxide.

DISCLOSURE OF CERTAIN EMBODIMENTS OF THE PRESENT DISCLOSURE

Technical Problem

An aspect of the present disclosure provides a positive electrode material for a lithium secondary battery, in which life characteristics are improved during fast charging at a low cost.

Another aspect of the present disclosure provides a method of preparing a positive electrode material which may reduce a single operating section of a second positive electrode active material by increasing charge resistance of the second positive electrode active material.

Another aspect of the present disclosure provides a positive electrode for a lithium secondary battery including the positive electrode material.

Another aspect of the present disclosure provides a lithium secondary battery including the positive electrode for a lithium secondary battery and having improved life characteristics during fast charging.

Technical Solution

According to an aspect of the present disclosure, there is provided a positive electrode material which includes a first positive electrode active material represented by Formula 1; and a second positive electrode active material represented by Formula 2, wherein the second positive electrode active material has an electrical conductivity of 0.1 μS/cm to 150 μS/cm, which is measured after the second positive electrode active material is prepared in the form of a pellet by compressing the second positive electrode active material at a rolling load of 400 kgf to 2,000 kgf:

[Formula 1]

[Formula 2]

wherein, in Formula 1, $M^1$ includes at least one selected from the group consisting of aluminum (Al), titanium (Ti), magnesium (Mg), and zirconium (Zr), and 0≤a≤0.2, and wherein, in Formula 2, $M^2$ includes at least one selected from the group consisting of Al, Ti, Mg, Zr, yttrium (Y), strontium (Sr), and boron (B), and 0<b≤0.6, 0<c≤0.35, 0<d≤0.35, and 0<e≤0.1.

According to another aspect of the present disclosure, there is provided a method of preparing a positive electrode material which includes preparing a first positive electrode active material represented by Formula 1 by mixing and sintering a cobalt oxide, a lithium-containing raw material, and a doping element $M^1$-containing raw material; preparing a second positive electrode active material represented by Formula 2 by solid-phase mixing and sintering a nickel oxide, a cobalt oxide, a manganese oxide, a doping element $M^2$-containing raw material, and a lithium-containing raw material; and mixing the formed first positive electrode active material and the formed second positive electrode active material, wherein the second positive electrode active material has an electrical conductivity of 0.1 µS/cm to 150 µS/cm, which is measured after the second positive electrode active material is prepared in the form of a pellet by compressing the second positive electrode active material at a rolling load of 400 kgf to 2,000 kgf:

$$LiCo_{1-a}M^1_aO_2 \quad \text{[Formula 1]}$$

$$LiNi_bCo_cMn_dM^2_eO_2 \quad \text{[Formula 2]}$$

wherein, in Formula 1, $M^1$ includes at least one selected from the group consisting of Al, Ti, Mg, and Zr, and $0 \leq a \leq 0.2$, and wherein, in Formula 2, $M^2$ includes at least one selected from the group consisting of Al, Ti, Mg, Zr, Y, Sr, and B, and $0 < b \leq 0.6$, $0 < c \leq 0.35$, $0 < d \leq 0.35$, and $0 < e \leq 0.1$.

According to another aspect of the present disclosure, there is provided a positive electrode for a lithium secondary battery which includes the positive electrode material according to the present disclosure.

According to another aspect of the present disclosure, there is provided a lithium secondary battery including the positive electrode according to the present disclosure.

Advantageous Effects

According to the present disclosure, manufacturing costs of a positive electrode material may be reduced by mixing a first positive electrode active material including a lithium cobalt oxide and a second positive electrode active material including a lithium nickel cobalt manganese oxide and using the mixture.

Also, since a nickel oxide, a cobalt oxide, and a manganese oxide are composited by using a solid-phase method during the preparation of the second positive electrode active material of the present disclosure, metallic elements present in the second positive electrode active material may not be uniformly mixed, but may be non-uniformly mixed. As a result, since a movement path of lithium ions is disturbed during fast charging above 1 C-rate, charge resistance of the second positive electrode active material may be increased. Thus, since an operation starting voltage of the second positive electrode active material may be increased and a single operating section thereof may be shortened to reduce overload of the second positive electrode active material, a lithium secondary battery having excellent life characteristics during fast charging may be provided by using the same.

MODES FOR CARRYING OUT VARIOUS EMBODIMENTS OF THE PRESENT DISCLOSURE

Figure 1:
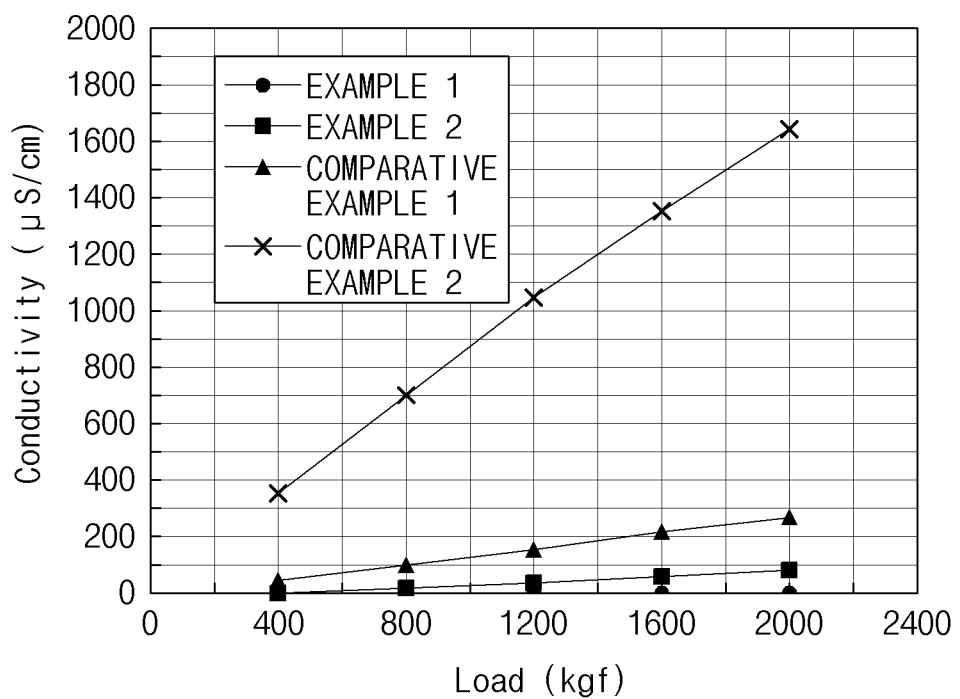
FIG. 1 is a graph illustrating changes in electrical conductivity with rolling load after compressing second positive electrode active materials prepared in Examples 1 and 2 of the present disclosure and Comparative Examples 1 and 2 in the form of pellets.

Hereinafter, the present disclosure will be described in more detail.

It will be understood that words or terms used in the specification and claims shall not be interpreted as the meaning defined in commonly used dictionaries, and it will be further understood that the words or terms should be interpreted as having a meaning that is consistent with their meaning in the context of the relevant art and the technical idea of the present disclosure, based on the principle that an inventor may properly define the meaning of the words or terms to best explain the present disclosure.

A positive electrode material, in which a lithium cobalt oxide and a lithium nickel cobalt manganese oxide are mixed, has been studied as a positive electrode material of a conventional lithium secondary battery for fast charging. However, in a case in which a secondary battery, to which the positive electrode material is applied, is fast charged above 1 C-rate, a section, where the lithium nickel cobalt manganese oxide having a lower operation starting voltage operates alone, occurs at an early stage of the fast charging due to different operation starting voltages of the lithium cobalt oxide and the lithium nickel cobalt manganese oxide. As described above, an excessive current is applied to the battery due to the fast charging above 1 C-rate, and accordingly, there has been a disadvantage that life characteristics of the secondary battery are degraded while being overloaded in the section where the lithium nickel cobalt manganese oxide operates alone.

In order to overcome these shortcomings in the art, as discussed in the present disclosure herein, a lithium cobalt oxide and a lithium nickel cobalt manganese oxide may be mixed in an appropriate mixing ratio and used, but electrical conductivity of the lithium nickel cobalt manganese oxide may be controlled to increase charge resistance of the lithium nickel cobalt manganese oxide while reducing manufacturing costs, and accordingly, a lithium secondary battery having improved life characteristics during fast charging may be prepared by reducing the single operating section of the lithium nickel cobalt manganese oxide, thereby leading to the completion of the positive electrode material of the present disclosure.

When described in more detail, one embodiment of a positive electrode active material of the present disclosure is a positive electrode material which includes a first positive electrode active material including a lithium cobalt oxide and a second positive electrode active material including a lithium nickel cobalt manganese oxide, wherein the second positive electrode active material has an electrical conductivity of 0.1 µS/cm to 150 µS/cm. Such conductivity is measured after the second positive electrode active material is prepared in the form of a pellet by compressing the second positive electrode active material at a rolling load of 400 kgf to 2,000 kgf.

Specifically, in one embodiment, the first positive electrode active material may be represented by Formula 1 below.

$$LiCo_{1-a}M^1_aO_2 \quad \text{[Formula 1]}$$

In Formula 1, $M^1$ includes at least one selected from the group consisting of aluminum (Al), titanium (Ti), magnesium (Mg), and zirconium (Zr), and $0 \leq a \leq 0.2$.

Since the first positive electrode active material is easily mass-produced due to easy preparation, has an operation starting voltage of 3.95 V, and has excellent capacity characteristics, the first positive electrode active material may exhibit stable life characteristics and output characteristics at high voltage.

The first positive electrode active material may include doping element $M^1$, and, in this case, structural stability of the first positive electrode active material may be improved. For example, the first positive electrode active material may include the doping element $M^1$ in an amount of 100 ppm to 10,000 ppm based on a total weight of the first positive electrode active material. In a case in which the doping element $M^1$ is included in an amount within the above range, the structural stability improvement effect may be further improved. Preferably, the first positive electrode active material may include $LiCoO_2$ or may include at least one doping element, for example, at least two doping elements, selected from the group consisting of Al, Ti, and Mg. For example, the first positive electrode active material may include $LiCo_eTi_{0.004}Mg_{0.004}Al_{0.004}O_2$.

Also, the first positive electrode active material may further include a coating layer including at least one coating element selected from the group consisting of Al, Ti, Mg, and Zr. For example, since the first positive electrode active material further includes the coating layer, a contact between the first positive electrode active material and an electrolyte solution included in a lithium secondary battery is blocked by the coating layer, the generation of a side reaction is suppressed, and thus, an effect of improving life characteristics may be achieved when used in the battery.

An amount of the coating element in the coating layer may be in a range of 100 ppm to 10,000 ppm, preferably 100 ppm to 5,000 ppm, and more preferably 200 ppm to 2,000 ppm based on the total weight of the first positive electrode active material. For example, in a case in which the coating element is included in an amount within the above range, since the effect of suppressing the generation of the side effect may be more effective, the life characteristics may be more improved when used in the battery.

The coating layer may be formed on an entire surface of the first positive electrode active material or may be partially formed. Specifically, in a case in which the coating layer is partially formed on the surface of the first positive electrode active material, the coating layer may be formed in an area of 20% or more to less than 100% of a total surface area of the first positive electrode active material.

The first positive electrode active material may have an average particle diameter ($D_{50}$) of 10 μm or more, preferably 10 μm to 20 μm, and more preferably 10 μm to 18 μm. In a case in which the average particle diameter ($D_{50}$) of the first positive electrode active material is 10 μm or more, high energy density may be achieved.

The average particle diameter ($D_{50}$) of the first positive electrode active material may be defined as a particle diameter at 50% in a cumulative particle diameter distribution. For example, the average particle diameter ($D_{50}$) of the first positive electrode active material may be measured by using a laser diffraction method. The laser diffraction method may generally measure a particle diameter ranging from a sub-micron level to a few mm, and may obtain highly repeatable and high resolution results. For example, in the measurement method of the average particle diameter ($D_{50}$) of the first positive electrode active material, the first positive electrode active material is introduced into a commercial laser diffraction particle size measurement instrument (e.g., Microtrac MT 3000) and irradiated with ultrasonic waves having a frequency of about 28 kHz and an output of 60 W, and the average particle diameter ($D_{50}$) at 50% in a cumulative particle diameter distribution of the measurement instrument may then be calculated.

One embodiment of the second positive electrode active material is represented by Formula 2 below, and has an electrical conductivity of 0.1 μS/cm to 150 μS/cm, which is measured after the second positive electrode active material is prepared in the form of a pellet by compressing the second positive electrode active material at a rolling load of 400 kgf to 2,000 kgf.

$$LiNi_bCo_cMn_dM^2_eO_2 \qquad \text{[Formula 2]}$$

In Formula 2, $M^2$ includes at least one selected from the group consisting of Al, Ti, Mg, Zr, yttrium (Y), strontium (Sr), and boron (B), and $0<b\le0.6$, $0<c\le0.35$, $0<d\le0.35$, and $0<e\le0.1$.

Preferably, the second positive electrode active material may include at least one selected from the group consisting of $Li(Ni_{0.50}Co_{0.20}Mn_{0.30})_{0.998}Sr_{0.002}O_2$, $Li(Ni_{0.50}Co_{0.20}Mn_{0.30})_{0.998}Y_{0.002}O_2$, $Li(Ni_{0.50}Co_{0.30}Mn_{0.20})_{0.998}Y_{0.002}O_2$, $Li(Ni_{0.50}Co_{0.30}Mn_{0.20})_{0.998}Sr_{0.002}O_2$, $Li(Ni_{0.60}Co_{0.20}Mn_{0.20})_{0.998}Y_{0.002}O_2$, and $Li(Ni_{0.60}Co_{0.20}Mn_{0.20})_{0.998}Sr_{0.002}O_2$.

The second positive electrode active material is a doped lithium nickel cobalt manganese oxide including doping element $M^2$, wherein the doping element $M^2$ may promote grain growth or may reduce deintercalation rate of lithium ions. Specifically, in a case in which the second positive electrode active material is doped with the doping element $M^2$, since grain growth of the second positive electrode active material is promoted by the doping element $M^2$, the second positive electrode active material may be formed as a monolithic structure.

The second positive electrode active material may include the doping element $M^2$ in an amount of 500 ppm to 2,000 ppm based on a total weight of the second positive electrode active material. Since the effect of promoting the grain growth of the second positive electrode active material is further improved by including the doping element $M^2$ in an amount within the above range, the second positive electrode active material may be formed as a monolithic structure.

Continuing with this embodiment of the second positive electrode active material, the electrical conductivity measured after the second positive electrode active material is prepared in the form of a pellet by compressing the second positive electrode active material at a rolling load of 400 kgf to 2,000 kgf is in a range of 0.1 μS/cm to 150 μS/cm, for example, 1 μS/cm to 100 μS/cm. In a case in which the electrical conductivity measured after the second positive electrode active material is prepared in the form of a pellet satisfies the above range, charge resistance of the second positive electrode active material is increased. Specifically, that the electrical conductivity is low at about 0.1 μS/cm to 150 μS/cm is due to the fact that metallic elements (nickel, cobalt, and manganese) present in the second positive electrode active material are not uniformly mixed in an atomic scale. Accordingly, since a movement path of lithium ions in the second positive electrode active material is disturbed during fast charging, the charge resistance of the second positive electrode active material is increased. The second positive electrode active material may not operate at its original operation starting voltage (3.70 V) due to the increase in the charge resistance, but may operate at an operation starting voltage of 3.75 V or more, for example, 3.80 V to 3.95 V, which is higher than a conventional operation starting voltage. In a case in which the second positive electrode active material is operated by being mixed with the first positive electrode active material, since a single operating section of the second positive electrode active material is shortened, overload of the second positive electrode active material is prevented when the second positive electrode active material is used in the secondary battery, and thus, life characteristics may be improved during fast charging.

For example, in a case in which the electrical conductivity measured after the second positive electrode active material is prepared in the form of a pellet is less than 0.1 μS/cm, since movement of the lithium ions in the second positive electrode active material may be insignificant due to the excessively low electrical conductivity, the second positive electrode active material may not operate as a positive electrode material. In a case in which the electrical conductivity measured after the second positive electrode active material is prepared in the form of a pellet is greater than 150 μS/cm, since the charge resistance of the second positive electrode active material is decreased, the single operating section of the second positive electrode active material may not be shortened and lifetime may be reduced when the second positive electrode active material is used in the secondary battery and subjected to fast charging.

In this case, the charge resistance denotes a voltage value of a charge profile when charged at a high current of 1 C-rate or more. In the present disclosure, when the voltage value of the charge profile is increased by 0.2 V or more in comparison to that before charging, it is determined that the charge resistance is increased to such an extent as to prevent the overload of the second positive electrode active material, which may preserve the lifetime of the second positive electrode active material.

After the second positive electrode active material is prepared in the form of a pellet by compressing the second positive electrode active material at a rolling load of 400 kgf to 2,000 kgf, preferably, 2,000 kgf, the electrical conductivity of the second positive electrode active material, for example, may be measured by introducing the second positive electrode active material into a commercially available electrical conductivity measuring device (powder resistivity measurement system, Loresta).

In addition, the second positive electrode active material may further include a coating layer including at least one coating element selected from the group consisting of Al, Ti, Mg, Zr, Y, Sr, and B. For example, since a contact between the second positive electrode active material and the electrolyte solution included in the lithium secondary battery is blocked by the coating layer or HF present in the electrolyte solution is consumed to suppress the generation of a side reaction, the life cycle characteristics may be improved when used in the battery and, in addition, packing density of the positive electrode active material may be increased.

In a case in which the coating element is further included as described above, an amount of the coating element in the coating layer may be in a range of 100 ppm to 10,000 ppm, preferably 100 ppm to 5,000 ppm, and more preferably 200 ppm to 2,000 ppm based on the total weight of the second positive electrode active material. For example, in a case in which the coating element is included in an amount within the above range based on the total weight of the second positive electrode active material, since the effect of suppressing the generation of the side effect may be more effective, the life cycle characteristics may be more improved when used in the battery.

The coating layer may be formed on an entire surface of the second positive electrode active material or may be partially formed. Specifically, in a case in which the coating layer is partially formed on the surface of the second positive electrode active material, the coating layer may be formed in an area of 20% or more to less than 100% of a total surface area of the second positive electrode active material.

The second positive electrode active material may have an average particle diameter ($D_{50}$) of 8 μm or less, preferably 4 μm to 8 μm, and more preferably 5 μm to 7 μm. In a case in which the average particle diameter ($D_{50}$) of the second positive electrode active material is 8 μm or less, the movement of the lithium ions is facilitated, but resistance is improved to such an extent that only the single operating section of the second positive electrode active material is shortened, and the second positive electrode active material may be formed in the form of a single particle, rather than in the form of a secondary particle in which primary particles of the second positive electrode active material are agglomerated into such secondary particles.

The average particle diameter ($D_{50}$) of the second positive electrode active material may be defined as a particle diameter at 50% in a cumulative particle diameter distribution, and the average particle diameter of the second positive electrode active material may be measured by using the same method as that used to measure the average particle diameter of the first positive electrode active material.

The second positive electrode active material may have a grain size of 200 nm to 500 nm. In a case in which the grain size of the second positive electrode active material satisfies the above range, since the single operating section of the second positive electrode active material is shortened while the charge resistance of the second positive electrode active material is increased and, accordingly, the second positive electrode active material is less overloaded, the life characteristics and capacity characteristics may be improved when the secondary battery using the same is fast charged. The grain size of the second positive electrode active material may be measured by using an X-ray diffraction (XRD) analyzer.

In the present disclosure, the positive electrode material may include the first positive electrode active material and the second positive electrode active material in a weight ratio of 40:60 to 90:10, and may preferably include the first positive electrode active material and the second positive electrode active material in a weight ratio of 50:50 to 80:20. In a case in which the positive electrode material includes the first positive electrode active material and the second positive electrode active material in a weight ratio of 40:60 to 90:10, since the overload of the second positive electrode active material is prevented, a lithium secondary battery having excellent life cycle characteristics during fast charging may be prepared and, in this case, manufacturing costs may be reduced.

Also, provided is one embodiment of a method of preparing a positive electrode material which includes: preparing a first positive electrode active material represented by the following Formula 1 by mixing and sintering a cobalt oxide, a lithium-containing raw material, and a doping element $M^1$-containing raw material; preparing a second positive electrode active material represented by the following Formula 2 by solid-phase mixing and sintering a nickel oxide, a cobalt oxide, a manganese oxide, a doping element $M^2$-containing raw material, and a lithium-containing raw material; and mixing the prepared first positive electrode active material and the prepared second positive electrode active material, wherein the second positive electrode active material has an electrical conductivity of 0.1 μS/cm to 150 μS/cm, which is measured after the second positive electrode active material is prepared in the form of a pellet by compressing the second positive electrode active material at a rolling load of 400 kgf to 2,000 kgf:

   [Formula 1]

   [Formula 2]

wherein, in Formula 1, $M^1$ includes at least one selected from the group consisting of Al, Ti, Mg, and Zr, and $0 \leq a \leq 0.2$, and, in Formula 2, $M^2$ includes at least one selected from the group consisting of Al, Ti, Mg, Zr, Y, Sr, and B, and $0 < b \leq 0.6$, $0 < c \leq 0.35$, $0 < d \leq 0.35$, and $0 < e \leq 0.1$.

Continuing with this embodiment, in order to prepare the positive electrode material according to the present disclosure, a first positive electrode active material represented by Formula 1 is first prepared. The preparing of the first positive electrode active material may be performed by using a conventional solid-phase method, and, specifically, a cobalt oxide, a lithium-containing raw material, and a doping element $M^1$-containing raw material are mixed and sintered to prepare the first positive electrode active material represented by Formula 1.

For example, the cobalt oxide may include at least one selected from the group consisting of $Co_3O_4$, CoOOH, and $Co(OH)_2$.

For example, the lithium-containing raw material is not particularly limited as long as it is a compound including a lithium source, but at least one selected from the group consisting of lithium carbonate ($Li_2CO_3$), lithium hydroxide (LiOH), $LiNO_3$, $CH_3COOLi$, and $Li_2(COO)_2$ may preferably be used.

The cobalt oxide and the lithium-containing raw material may be mixed such that a molar ratio of the cobalt oxide to the lithium-containing raw material is in a range of 1:1.00 to 1:1.10, for example, 1:1.02 to 1:1.08. In a case in which the cobalt oxide and the lithium-containing raw material are mixed in a molar ratio within the above range, the positive electrode active material prepared may exhibit excellent capacity.

The lithium-containing raw material may be determined according to amounts of lithium and metal (Co) in the finally prepared positive electrode active material, and the lithium-containing raw material may preferably be used in an amount such that a molar ratio of lithium included in the lithium-containing raw material to cobalt included in the cobalt oxide (molar ratio of Li/Co) is 1.00 or more, for example, 1.02 to 1.08. In a case in which the molar ratio of the lithium-containing raw material to the cobalt oxide satisfies the above range, the positive electrode active material prepared may exhibit excellent capacity.

The doping element $M^1$-containing raw material may be included in an amount of 100 ppm to 10,000 ppm, for example, 100 ppm to 5,000 ppm based on a total combined weight of the cobalt oxide and the lithium-containing raw material. Since the doping element $M^1$-containing raw material is included in an amount within the above range, surface resistance may be increased, the deintercalation rate of the lithium ions may be reduced, and effects of improving structural stability and lifetime of the battery prepared by using the same may be achieved. For example, the doping element $M^1$-containing raw material may include at least one metallic element selected from the group consisting of Al, Ti, Mg, and Zr. Specifically, the doping element $M^1$-containing raw material may include at least one selected from the group consisting of $Al_2O_3$, $TiO_2$, MgO, and $ZrO_2$.

The sintering may be performed in a temperature range of 900° C. to 1,100° C., for example, 950° C. to 1,080° C. In a case in which the sintering temperature satisfies the above range, since the raw materials may not remain in the particles, high-temperature stability of the battery may be improved and, accordingly, bulk density and crystallinity are improved. As a result, structural stability of the first positive electrode active material may be improved. Also, since the particles of the positive electrode active material may uniformly grow, volume capacity of the battery may be improved.

The sintering may be performed for 2 hours to 24 hours, for example, 5 hours to 12 hours. In a case in which the sintering time satisfies the above range, a highly crystalline first positive electrode active material may be obtained, and production efficiency may also be improved.

Continuing with this exemplary embodiment of a method of the present disclosure, a nickel oxide, a cobalt oxide, a manganese oxide, doping element $M^2$, and a lithium-containing raw material are solid-phase mixed and sintered to prepare the second positive electrode active material represented by Formula 2.

For example, the nickel oxide may include at least one selected from the group consisting of NiO, $Ni(OH)_2$, and NiOOH.

For example, the cobalt oxide may include at least one selected from the group consisting of $Co_3O_4$, CoOOH, and $Co(OH)_2$.

For example, the manganese oxide may include at least one selected from the group consisting of $Mn_2O_3$, $MnO_2$, $Mn_3O_4$, and MnO.

The lithium-containing raw material is not particularly limited as long as it is a compound including a lithium source, but at least one selected from the group consisting of lithium carbonate ($Li_2CO_3$), lithium hydroxide (LiOH), $LiNO_3$, $CH_3COOLi$, and $Li_2(COO)_2$ may preferably be used.

In the preparing of the second positive electrode active material, the solid-phase mixing is performed such that a molar ratio of nickel:cobalt:manganese:lithium:doping element $M^2$ is in a range of 40:30:30:104:2 to 60:20:20:100:0, for example, 50:30:30:103:1 to 60:20:20:102:0. In a case in which the solid-phase mixing is performed such that the molar ratio of nickel:cobalt:manganese:lithium:doping element $M^2$ is within the above range, a more stable life performance may be achieved even during fast charging above 4.3 V than that of a positive electrode active material prepared by including nickel in an amount of greater than 60%.

In a case in which the lithium nickel cobalt manganese oxide is synthesized by using the solid-phase method as in the present disclosure, the charge resistance of the second positive electrode active material may be increased. When described in more detail, in a case in which the nickel oxide, the cobalt oxide, the manganese oxide, the doping element $M^2$-containing raw material, and the lithium-containing raw material are mixed and sintered, nickel, cobalt, and manganese elements present in the second positive electrode active material are not uniformly mixed in an atomic scale. As a result, the movement path of the lithium ions is disturbed due to the metallic elements agglomerated in the second positive electrode active material during fast charging above 1 C-rate, and, accordingly, the charge resistance of the second positive electrode active material may be increased.

The doping element $M^2$-containing raw material may be doped in an amount of 2,000 ppm to 10,000 ppm, for example, 3,000 ppm to 9,000 ppm based on the total weight of the second positive electrode active material. Since the doping element $M^2$-containing raw material is doped in an amount within the above range, the grain growth of the second positive electrode active material may be promoted, and thus, the second positive electrode active material may be formed as a monolithic structure or the deintercalation rate of the lithium ions in the second positive electrode active material may be reduced. For example, the doping element $M^2$-containing raw material may include at least one metallic element selected from the group consisting of Al, Ti, Mg, Zr, Y, Sr, and B. Specifically, the doping element $M^2$-containing raw material may include at least one selected from the group consisting of $Al_2O_3$, $TiO_2$, MgO, $ZrO_2$, $Y_2O_3$, SrO, and $H_3BO_3$.

The sintering may be performed in a temperature range of 850° C. to 1,050° C., for example, 900° C. to 1,000° C. In a case in which the sintering temperature satisfies the above range, since the raw materials may not remain in the particles, the high-temperature stability of the battery may be improved and, accordingly, the bulk density and crystallinity are improved. As a result, structural stability of the second positive electrode active material may be improved.

The sintering may be performed for 2 hours to 24 hours, for example, 5 hours to 12 hours. In a case in which the sintering time satisfies the above range, a highly crystalline second positive electrode active material may be obtained, and production efficiency may also be improved.

Finally, continuing further with this exemplary embodiment, the first positive electrode active material and the second positive electrode active material are mixed. In this case, the first positive electrode active material and the second positive electrode active material are mixed in a weight ratio of 40:60 to 90:10, for example, 50:50 to 80:20. The mixing is not particularly limited as long as it is a method capable of uniformly mixing the first positive electrode active material and the second positive electrode active material. A lithium secondary battery having excellent life cycle characteristics during fast charging may be prepared by mixing the first positive electrode active material and the second positive electrode active material in the above ratio and, in this case, manufacturing costs may be reduced.

Also, in another embodiment of the present disclosure is a positive electrode for a lithium secondary battery including the positive electrode material according to the present disclosure. Specifically, provided is the positive electrode for a lithium secondary battery which includes a positive electrode collector and a positive electrode material layer formed on the positive electrode collector, wherein the positive electrode material layer includes the positive electrode material according to the present disclosure.

In this case, since the operation starting voltage of the second positive electrode active material is increased by using the positive electrode material including a first positive electrode active material and a second positive electrode active material, such as are described above, as the positive electrode material, such a formed positive electrode may prevent the overload of the second positive electrode active material.

In this case, to describe an exemplary embodiment of such a battery, the positive electrode material may be considered to be the same as described above, and as such a detailed descriptions thereof will not be repeated here, though the remaining configurations will be described in detail below.

The positive electrode collector is not particularly limited as long as it has conductivity without causing adverse chemical changes in the battery, and, for example, stainless steel, aluminum, nickel, titanium, fired carbon, or aluminum or stainless steel that is surface-treated with one of carbon, nickel, titanium, silver, or the like may be used. Also, the positive electrode collector may typically have a thickness of 3 μm to 500 μm, and microscopic irregularities may be formed on the surface of the collector to improve the adhesion of the positive electrode active material. The positive electrode collector, for example, may be used in various shapes such as that of a film, a sheet, a foil, a net, a porous body, a foam body, a non-woven fabric body, and the like.

The positive electrode material layer may selectively include a binder as well as a conductive agent, if necessary, in addition to the above-described positive electrode material.

In this case, the positive electrode material may be included in an amount of 80 wt % to 99 wt %, for example, 85 wt % to 98.5 wt % based on a total weight of the positive electrode material layer. When the positive electrode material is included in an amount within the above range, excellent capacity characteristics may be obtained.

The conductive agent is used to provide conductivity to the electrode, wherein any conductive agent may be used without particular limitation as long as it has suitable electron conductivity without causing adverse chemical changes in the battery. Specific examples of the conductive agent may be graphite such as natural graphite or artificial graphite; carbon based materials such as carbon black, acetylene black, Ketjen black, channel black, furnace black, lamp black, thermal black, and carbon fibers; powder or fibers of metal such as copper, nickel, aluminum, and silver; conductive whiskers such as zinc oxide whiskers and potassium titanate whiskers; conductive metal oxides such as titanium oxide; or conductive polymers such as polyphenylene derivatives, and any one thereof or a mixture of two or more thereof may be used. The conductive agent may be typically included in an amount of 0.1 wt % to 15 wt % based on the total weight of the positive electrode material layer.

The binder improves the adhesion between the positive electrode material particles and the adhesion between the positive electrode material and the current collector. Specific examples of the binder may be polyvinylidene fluoride (PVDF), polyvinylidene fluoride-hexafluoropropylene copolymer (PVDF-co-HFP), polyvinyl alcohol, polyacrylonitrile, carboxymethyl cellulose (CMC), starch, hydroxypropyl cellulose, regenerated cellulose, polyvinylpyrrolidone, tetrafluoroethylene, polyethylene, polypropylene, an ethylene-propylene-diene monomer (EPDM), a sulfonated EPDM, a styrene-butadiene rubber (SBR), a fluorine rubber, or various copolymers thereof, and any one thereof or a mixture of two or more thereof may be used. The binder may be included in an amount of 0.1 wt % to 15 wt % based on the total weight of the positive electrode material layer.

The positive electrode may be prepared according to a typical method of preparing a positive electrode except that the above-described positive electrode material is used. Specifically, a composition for forming a positive electrode material layer, which is prepared by dissolving or dispersing the positive electrode material as well as selectively the binder and the conductive agent in a solvent, is coated on the positive electrode collector, and the positive electrode may then be prepared by drying and rolling the coated positive electrode collector.

The solvent may be a solvent normally used in the art. The solvent may include dimethyl sulfoxide (DMSO), isopropyl alcohol, N-methylpyrrolidone (NMP), acetone, or water, and any one thereof or a mixture of two or more thereof may be used. An amount of the solvent used may be sufficient if the solvent may dissolve or disperse the positive electrode material, the conductive agent, and the binder in consideration of a coating thickness of a slurry and manufacturing yield, and may allow to have a viscosity that may provide excellent thickness uniformity during the subsequent coating for the preparation of the positive electrode.

Also, as another method, the positive electrode may be prepared by casting the composition for forming a positive electrode material layer on a separate support and then laminating a film separated from the support on the positive electrode collector.

Furthermore, in the present disclosure, an electrochemical device including the positive electrode may be prepared. The electrochemical device may specifically be a battery or a capacitor, and, for example, may be a lithium secondary battery.

The lithium secondary battery specifically includes a positive electrode, a negative electrode disposed to face the positive electrode, a separator disposed between the positive electrode and the negative electrode, and an electrolyte, wherein, since the positive electrode is the same as described above, detailed descriptions thereof will be omitted, and the remaining configurations will be only described in detail below.

Also, the lithium secondary battery may further selectively include a battery container accommodating an electrode assembly of the positive electrode, the negative electrode, and the separator, and a sealing member sealing the battery container.

Since the lithium secondary battery according to the present disclosure includes the positive electrode including the positive electrode material according to the present disclosure, the operation starting voltage of the second positive electrode active material is increased to prevent the overload thereof, and, accordingly, a lithium secondary battery having improved life cycle characteristics during fast charging may be prepared. In this case, the fast charging denotes a method of charging a battery having a driving voltage of 3V to 4.35V at a high current of 1 C-rate or more, for example, 1 C-rate to 1.5 C-rate.

In the lithium secondary battery, the negative electrode includes a negative electrode collector and a negative electrode active material layer disposed on the negative electrode collector.

The negative electrode collector is not particularly limited as long as it has high conductivity without causing adverse chemical changes in the battery, and, for example, copper, stainless steel, aluminum, nickel, titanium, fired carbon, copper or stainless steel that is surface-treated with one of carbon, nickel, titanium, silver, or the like, and an aluminum-cadmium alloy may be used. Also, the negative electrode collector may typically have a thickness of 3 μm to 500 μm, and, similar to the positive electrode collector, microscopic irregularities may be formed on the surface of the collector to improve the adhesion of a negative electrode active material. The negative electrode collector, for example, may be used in various shapes such as that of a film, a sheet, a foil, a net, a porous body, a foam body, a non-woven fabric body, and the like.

The negative electrode active material layer selectively includes a binder and a conductive agent in addition to the negative electrode active material.

A compound capable of reversibly intercalating and deintercalating lithium may be used as the negative electrode active material. Specific examples of the negative electrode active material may be a carbonaceous material such as artificial graphite, natural graphite, graphitized carbon fibers, and amorphous carbon; a metallic compound alloyable with lithium such as silicon (Si), aluminum (Al), tin (Sn), lead (Pb), zinc (Zn), bismuth (Bi), indium (In), magnesium (Mg), gallium (Ga), cadmium (Cd), a Si alloy, a Sn alloy, or an Al alloy; a metal oxide which may be doped and undoped with lithium such as $SiO_\beta(0<\beta<2)$, $SnO_2$, vanadium oxide, and lithium vanadium oxide; or a composite including the metallic compound and the carbonaceous material such as a Si—C composite or a Sn—C composite, and any one thereof or a mixture of two or more thereof may be used. Also, a metallic lithium thin film may be used as the negative electrode active material. Furthermore, both low crystalline carbon and high crystalline carbon may be used as the carbon material. Typical examples of the low crystalline carbon may be soft carbon and hard carbon, and typical examples of the high crystalline carbon may be irregular, planar, flaky, spherical, or fibrous natural graphite or artificial graphite, Kish graphite, pyrolytic carbon, mesophase pitch-based carbon fibers, meso-carbon microbeads, mesophase pitches, and high-temperature sintered carbon such as petroleum or coal tar pitch derived cokes.

The negative electrode active material may be included in an amount of 80 wt % to 99 wt % based on a total weight of the negative electrode active material layer.

The binder is a component that assists in the binding between the conductive agent, the active material, and the current collector, wherein the binder is typically added in an amount of 0.1 wt % to 10 wt % based on the total weight of the negative electrode active material layer. Examples of the binder may be polyvinylidene fluoride (PVDF), polyvinyl alcohol, carboxymethylcellulose (CMC), starch, hydroxypropylcellulose, regenerated cellulose, polyvinylpyrrolidone, tetrafluoroethylene, polyethylene, polypropylene, an ethylene-propylene-diene polymer (EPDM), a sulfonated-EPDM, a styrene-butadiene rubber, a fluoro rubber, and various copolymers thereof.

The conductive agent is a component for further improving conductivity of the negative electrode active material, wherein the conductive agent may be added in an amount of 10 wt % or less, for example, 5 wt % or less based on the total weight of the negative electrode active material layer. The conductive agent is not particularly limited as long as it has conductivity without causing adverse chemical changes in the battery, and, for example, a conductive material such as: graphite such as natural graphite or artificial graphite; carbon black such as acetylene black, Ketjen black, channel black, furnace black, lamp black, and thermal black; conductive fibers such as carbon fibers or metal fibers; metal powder such as fluorocarbon powder, aluminum powder, and nickel powder; conductive whiskers such as zinc oxide whiskers and potassium titanate whiskers; conductive metal oxide such as titanium oxide; or polyphenylene derivatives may be used.

For example, the negative electrode active material layer may be prepared by coating a composition for forming a negative electrode, which is prepared by dissolving or dispersing selectively the binder and the conductive agent as well as the negative electrode active material in a solvent, on the negative electrode collector and drying the coated negative electrode collector, or may be prepared by casting the composition for forming a negative electrode on a separate support and then laminating a film separated from the support on the negative electrode collector.

In the lithium secondary battery, the separator separates the negative electrode and the positive electrode and provides a movement path of lithium ions, wherein any separator may be used as the separator without particular limitation as long as it is typically used in a lithium secondary battery, and particularly, a separator having high moisture-retention ability for an electrolyte as well as low resistance to the transfer of electrolyte ions may be used. Specifically, a porous polymer film, for example, a porous polymer film prepared from a polyolefin-based polymer, such as an ethylene homopolymer, a propylene homopolymer, an ethylene/butene copolymer, an ethylene/hexene copolymer, and an ethylene/methacrylate copolymer, or a laminated structure having two or more layers thereof may be used. Also, a typical porous nonwoven fabric, for example, a nonwoven fabric formed of high melting point glass fibers or polyethylene terephthalate fibers may be used. Furthermore, a coated separator including a ceramic component or a polymer material may be used to secure heat resistance or mechanical strength, and the separator having a single layer or multilayer structure may be selectively used.

Also, the electrolyte used in the present disclosure may include an organic liquid electrolyte, an inorganic liquid electrolyte, a solid polymer electrolyte, a gel-type polymer electrolyte, a solid inorganic electrolyte, or a molten-type inorganic electrolyte which may be used in the preparation of the lithium secondary battery, but the present disclosure is not limited thereto.

Specifically, the electrolyte may include an organic solvent and a lithium salt.

Any organic solvent may be used as the organic solvent without particular limitation so long as it may function as a medium through which ions involved in an electrochemical reaction of the battery may move. Specifically, an ester-based solvent such as methyl acetate, ethyl acetate, propyl acetate, methyl propionate, ethyl propionate, propyl propionate, butyl propionate, γ-butyrolactone, and ε-caprolactone; an ether-based solvent such as dimethoxyethane, diethoxyethane, dibutyl ether, or tetrahydrofuran; a ketone-based solvent such as cyclohexanone; an aromatic hydrocarbon-based solvent such as benzene and fluorobenzene; or a carbonate-based solvent such as dimethyl carbonate (DMC), diethyl carbonate (DEC), methylethyl carbonate (MEC), ethylmethyl carbonate (EMC), ethylene carbonate (EC), and propylene carbonate (PC); an alcohol-based solvent such as ethyl alcohol and isopropyl alcohol; nitriles such as R—CN (where R is a linear, branched, or cyclic C2-C20 hydrocarbon group and may include a double-bond aromatic ring or ether bond); amides such as dimethylformamide; dioxolanes such as 1,3-dioxolane; or sulfolanes may be used as the organic solvent. Among these solvents, the carbonate-based solvent may be used, and, for example, a mixture of a cyclic carbonate (e.g., ethylene carbonate or propylene carbonate) having high ionic conductivity and high dielectric constant, which may increase charge/discharge performance of the battery, and a low-viscosity linear carbonate-based compound (e.g., ethylmethyl carbonate, dimethyl carbonate, or diethyl carbonate) may be used. In this case, the performance of the electrolyte solution may be excellent when the cyclic carbonate and the chain carbonate are mixed in a volume ratio of about 1:1 to about 1:9.

The lithium salt may be used without particular limitation as long as it is a compound capable of providing lithium ions used in the lithium secondary battery. Specifically, $LiPF_6$, $LiClO_4$, $LiAsF_6$, $LiBF_4$, $LiSbF_6$, $LiAlO_4$, $LiAlCl_4$, $LiCF_3SO_3$, $LiC_4F_9SO_3$, $LiN(C_2F_5SO_3)_2$, $LiN(C_2F_5SO_2)_2$, $LiN(CF_3SO_2)_2$, LiCl, LiI, or $LiB(C_2O_4)_2$ may be used as the lithium salt. The lithium salt may be used in a concentration range of 0.1 M to 2.0 M. In a case in which the concentration of the lithium salt is included within the above range, since the electrolyte may have appropriate conductivity and viscosity, excellent performance of the electrolyte may be obtained and lithium ions may effectively move.

In order to improve lifetime characteristics of the battery, suppress the reduction in battery capacity, and improve discharge capacity of the battery, at least one additive, for example, a halo-alkylene carbonate-based compound such as difluoroethylene carbonate, pyridine, triethylphosphite, triethanolamine, cyclic ether, ethylenediamine, n-glyme, hexaphosphorictriamide, a nitrobenzene derivative, sulfur, a quinone imine dye, N-substituted oxazolidinone, N,N-substituted imidazolidine, ethylene glycol dialkyl ether, an ammonium salt, pyrrole, 2-methoxy ethanol, or aluminum trichloride, may be further added to the electrolyte in addition to the electrolyte components. In this case, the additive may be included in an amount of 0.1 wt % to 5 wt % based on a total weight of the electrolyte.

As described above, since the lithium secondary battery including the positive electrode material according to the present disclosure stably exhibits excellent discharge capacity, output characteristics, and life cycle characteristics, the lithium secondary battery is suitable for portable devices, such as mobile phones, notebook computers, and digital cameras, and electric cars such as hybrid electric vehicles (HEVs).

Thus, according to another embodiment of the present disclosure, a battery module including the lithium secondary battery as a unit cell and a battery pack including the battery module are provided.

The battery module or the battery pack may be used as a power source of at least one medium and large sized device of a power tool; electric cars including an electric vehicle (EV), a hybrid electric vehicle, and a plug-in hybrid electric vehicle (PHEV); or a power storage system.

A shape of the lithium secondary battery of the present disclosure is not particularly limited, but a cylindrical type using a can, a prismatic type, a pouch type, or a coin type may be used.

The lithium secondary battery according to the present disclosure may not only be used in a battery cell that is used as a power source of a small device, but may also be used as a unit cell in a medium and large sized battery module including a plurality of battery cells.

Hereinafter, the present disclosure will be described in detail, according to specific examples. The present disclosure may, however, be embodied in many different forms and should not be construed as being limited to the embodiments set forth herein. Rather, these exemplary embodiments are provided so that this description will be thorough and complete, and will fully convey the scope of the present disclosure to those skilled in the art.

EXAMPLES

Example 1

Positive Electrode Material Preparation 100 g of $Co_3O_4$, 47 g of $Li_2CO_3$, 0.4069 g of $TiO_2$, 0.2858 g of $MgO_2$, and 0.2304 g of $Al_2O_3$ were solid-phase mixed by using ball milling and sintering was performed at 1,050° C. for 9 hours to prepare a Ti, Mg, and Al-doped lithium cobalt oxide ($LiCo_{0.988}Ti_{0.004}Mg_{0.004}Al_{0.004}O_2$) having an average particle diameter of 16 μm. The above-prepared Ti, Mg, and Al-doped lithium cobalt oxide was used as a first positive electrode active material.

46.41 g of NiO, 19.95 g of $Co_3O_4$, 29.43 g of $Mn_2O_3$, 47.29 g of $Li_2CO_3$, and 0.193 g of SrO were solid-phase mixed and sintered at 990° C. for 10 hours to prepare a Sr-doped lithium nickel cobalt manganese oxide (molar ratio of nickel:cobalt:manganese=5:2:3, NCM523) having an average particle diameter of 5.8 μm; and it was used as a second positive electrode active material.

Next, 96 parts by weight of a positive electrode material, in which the first positive electrode active material and the second positive electrode active material were mixed in a weight ratio of 7:3, 2 parts by weight of a Denka black conductive agent, and 2 parts by weight of a polyvinylidene fluoride (PVDF) binder were mixed in a N-methylpyrrolidone (NMP) solvent to prepare a composition for forming a positive electrode.

A 20 μm thick aluminum foil was coated with the above-prepared composition for forming a positive electrode, dried, and then roll-pressed to prepare a positive electrode.

95.6 parts by weight of artificial graphite as a negative electrode active material, 0.75 part by weight of carbon black as a conductive agent, and 3.65 parts by weight of carboxymethyl cellulose (CMC), as a binder, were mixed and added to $H_2O$, as a solvent, to prepare a composition for forming a negative electrode. A 20 μm thick copper foil was coated with the composition for forming a negative electrode, dried, and then roll-pressed to prepare a negative electrode.

After the above-prepared positive electrode and negative electrode were stacked with a polyethylene separator to prepare an electrode assembly, the electrode assembly was put in a battery case, and an electrolyte solution, in which 1.0 M $LiPF_6$ was dissolved in a mixed solvent, was prepared by mixing ethylene carbonate, propyl propionate, and diethyl carbonate in a ratio of 3:1:6. The electrolyte solution was then injected into the battery case to prepare a lithium secondary battery.

Example 2

A first positive electrode, active material, a second positive electrode active material, a positive electrode, a negative electrode, and a lithium secondary battery including the same were prepared in the same manner as in Example 1 except that $ZrO_2$, instead of SrO, was doped to prepare a second positive electrode active material having an electrical conductivity of 82.2 μS/cm during the preparation of the second positive electrode active material.

Comparative Example 1

$NiSO_4$, $CoSO_4$, and $MnSO_4$ were mixed in a $H_2O$ solvent in amounts such that a molar ratio of nickel:cobalt:manganese was 5:2:3 to prepare a transition metal-containing solution with a concentration of 2M during the preparation of a second positive electrode active material.

A container containing the transition metal-containing solution was connected to a 5 L batch-type reactor. In addition, a NaOH aqueous solution with a concentration of 4 M and a 7 wt % $NH_4OH$ aqueous solution were prepared and respectively connected to the batch-type reactor. 3 L of deionized water was put in the batch-type reactor, and the reactor was then purged with nitrogen gas at a rate of 2 L/min to remove dissolved oxygen in the water and create a non-oxidizing atmosphere in the reactor.

The transition metal-containing solution, the NaOH aqueous solution, and the $NH_4OH$ aqueous solution were respectively added to the batch-type reactor at rates of 180 mL/min, 180 mL/min, and 10 mL/min and a co-precipitation reaction was performed for 12 hours to precipitate particles of nickel manganese cobalt hydroxide at a pH of 12. The precipitated nickel manganese cobalt hydroxide particles are separated, washed, and then dried in an oven at 120° C. for 12 hours to prepare a precursor for a second positive electrode active material.

The precursor thus obtained was dry-mixed with $LiOH \cdot H_2O$ (1.04 mol of LiOH relative to 1 mol of the precursor) and sintering was performed at 990° C. for 9 hours to prepare a lithium nickel cobalt manganese oxide (molar ratio of nickel:cobalt:manganese=5:2:3, NCM523). A first positive electrode active material, a positive electrode, a negative electrode, and a lithium secondary battery including the same were prepared in the same manner as in Example 1 except that the lithium nickel cobalt manganese oxide formed as above was used as a second positive electrode active material in place of the second positive electrode active material of Example 1.

Comparative Example 2

A first positive electrode active material, a positive electrode, a negative electrode, and a lithium secondary battery including the same were prepared in the same manner as in Comparative Example 1 except that a nickel cobalt manganese hydroxide precursor, which was prepared by changing co-precipitation reaction time from 12 hours to 0.5 hours, was used during the preparation of the second positive electrode active material.

Experimental Example 1: Electrical Conductivity Measurement

After each of the second positive electrode active materials prepared in Examples 1 and 2 and Comparative Examples 1 and 2 was prepared in the form of pellets by compressing each second positive electrode active material at rolling loads of 400 kgf, 800 kgf, 1,200 kgf, 1,600 kgf, and 2,000 kgf, electrical conductivities of each second positive electrode active material were measured as in Table 1 and FIG. 1 by using a powder resistivity measurement system (Loresta).

TABLE 1

| | Electrical conductivity (μS/cm) | | | | |
|---|---|---|---|---|---|
| | 400 kgf | 800 kgf | 1200 kgf | 1600 kgf | 2000 kgf |
| Example 1 | 0.07 | 0.11 | 0.32 | 0.67 | 1.3 |
| Example 2 | 4.4 | 19.3 | 38.3 | 59.6 | 82.2 |
| Comparative Example 1 | 42.2 | 101.0 | 157.0 | 121.0 | 267.0 |
| Comparative Example 2 | 358.7 | 699.5 | 1,050.0 | 1,360.0 | 1,640.0 |

In this regard, FIG. 1 is a graph illustrating changes in electrical conductivity with the rolling load of the second positive electrode active material in the form of a pellet after compressing the second positive electrode active materials prepared in Examples 1 and 2 and Comparative Examples 1 and 2 in the form of pellets. As illustrated in FIG. 1, it may be confirmed that the second positive electrode active materials according to Examples 1 and 2 exhibited low electrical conductivities of 100 μS/cm or less regardless of the rolling load. With respect to Example 2, since an effect of grain growth during sintering was insignificant by doping with Zr instead of Sr promoting the grain growth, the electrical conductivity was increased in comparison to that of Example 1 while its grain size was reduced. In contrast, with respect to the second positive electrode active materials according to Comparative Examples 1 and 2, it may be confirmed that the larger the rolling load compressing the second positive electrode active material was, the significantly higher the electrical conductivity was. With respect to Comparative Examples 1 and 2, since the second positive electrode active materials were synthesized by a wet method using the co-precipitated precursor, mixing uniformity of the second positive electrode active materials was excellent, and, accordingly, it was confirmed that the second positive electrode active materials had high electrical conductivity. Particularly, in a case in which the co-precipitation reaction was performed in a short period of time as in Comparative Example 2, a particle size of the precursor was reduced and, accordingly, a particle size of the final positive electrode active material after the sintering was also reduced. Accordingly, the electrical conductivity of the positive electrode active material of Comparative Example 2 was increased in comparison to that of Comparative Example 1. That is, in a case in which the second positive electrode active materials were synthesized by using a dry method as in Examples 1 and 2, the mixing uniformity was reduced in comparison to that of Comparative Examples 1 and 2, the second positive electrode active material particles were locally agglomerated, and, accordingly, it was confirmed that the second positive electrode active materials prepared in the form of pellets also exhibited a low electrical conductivity of 100 μS/cm or less.

Experimental Example 2: Charge Profile Measurement

Charge profiles of the lithium secondary batteries prepared in Examples 1 and 2 and Comparative Examples 1 and 2 were measured at 4.35 V and a room temperature of 25° C.

Specifically, each of the lithium secondary batteries prepared in Examples 1 and 2 and Comparative Examples 1 and 2 was charged at a constant current of 1.0 C to 4.35 V at a room temperature of 25° C. and cut-off charged at 0.05 C to measure the charge profile of each of the lithium secondary batteries according to Examples 1 and 2 and Comparative Examples 1 and 2.

Figure 2:
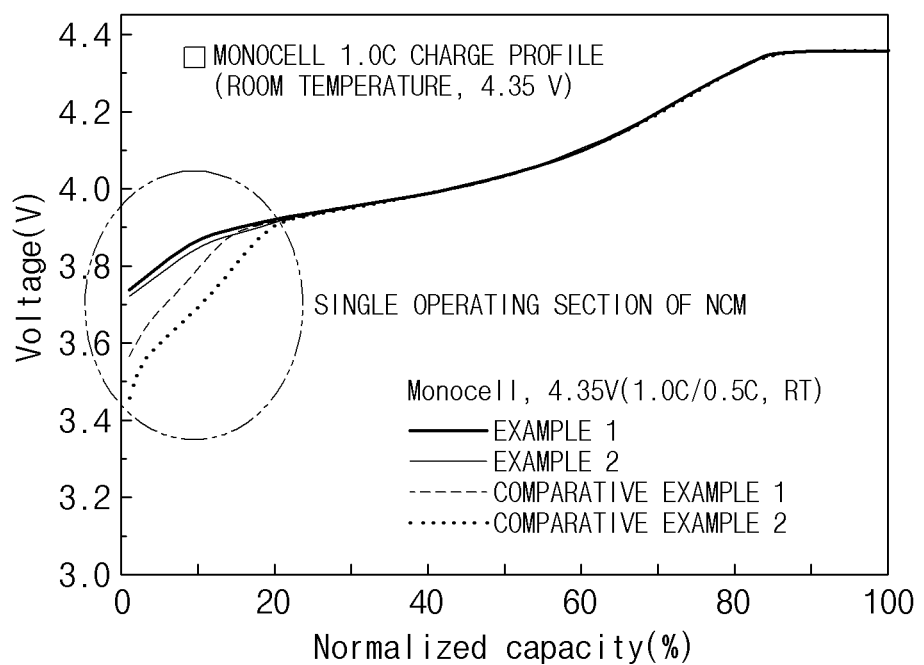
FIG. 2 is a graph illustrating charge profiles of lithium secondary batteries prepared in Examples 1 and 2 of the present disclosure and Comparative Examples 1 and 2.

In this regard, FIG. 2 is a graph illustrating the charge profiles of the lithium secondary batteries prepared in Examples 1 and 2 of the present disclosure and Comparative Examples 1 and 2. In the graph, a portion indicated by a dotted circle is single operating sections of the second positive electrode active materials at an early stage of fast charging. As illustrated in FIG. 2, with respect to Examples 1 and 2, it may be confirmed that the single operating sections of the second positive electrode active materials were reduced in comparison to those of Comparative Examples 1 and 2. The reason for this was that metallic elements present in the second positive electrode active materials were not uniformly mixed when the second positive electrode active materials were prepared by a solid-phase mixing method as in Examples 1 and 2. Accordingly, with respect to the second positive electrode active materials prepared in Examples 1 and 2, since the movement of the lithium ions in the second positive electrode active materials was disturbed, charging was not facilitated in comparison to Comparative Examples 1 and 2 in which the metallic elements were uniformly mixed, and, accordingly, operation starting voltages of the second positive electrode active materials of Examples 1 and 2 were increased.

That is, since the operation starting voltages of the second positive electrode active materials were increased as in Examples 1 and 2, it may be confirmed that the section where the second positive electrode active material operates alone was reduced.

Thus, in a case in which the lithium secondary batteries of Examples 1 and 2 were used, it was predicted that the problem of overload due to the reduction of the single operating section of the second positive electrode active material may be addressed.

Experimental Example 3: Life Cycle Characteristics Evaluation

Life cycle characteristics of the lithium secondary batteries prepared in Examples 1 and 2 and Comparative Examples 1 and 2 were measured at 4.35 V and a room temperature of 25° C.

Specifically, each of the lithium secondary batteries prepared in Examples 1 and 2 and Comparative Examples 1 and 2 was charged at a constant current of 1.0 C to 4.35 V at a room temperature of 25° C. and cut-off charged at 0.05 C. Thereafter, each of the lithium secondary batteries was discharged at a constant current of 0.5 C to a voltage of 3.0 V. The charging and discharging behaviors were set as one cycle, and, after this cycle was repeated 80 times, the life cycle characteristics of the lithium secondary batteries according to Examples 1 and 2 and Comparative Examples 1 and 2 were measured.

Figure 3:
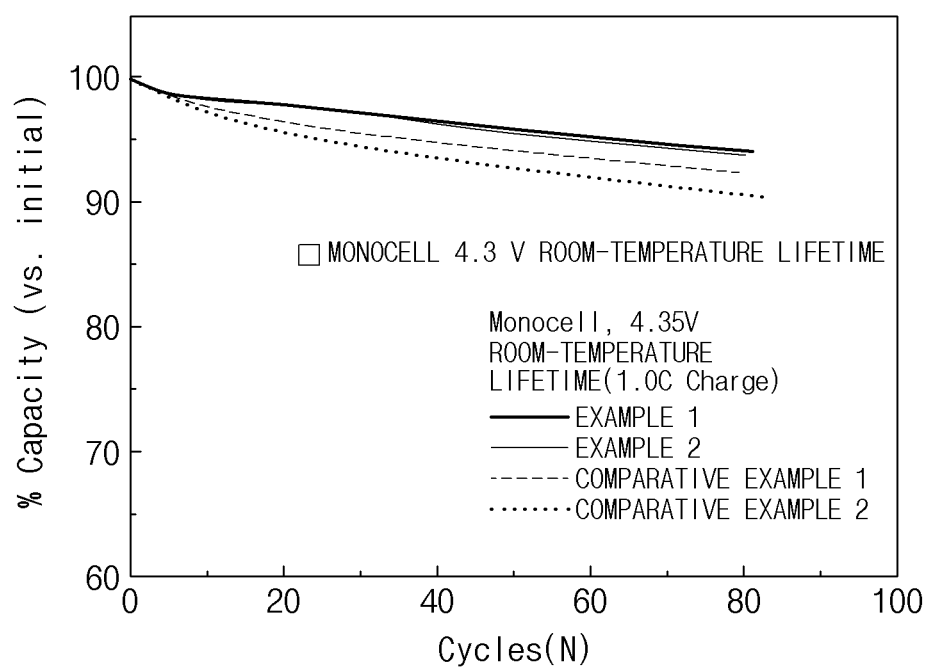
FIG. 3 is a graph illustrating life characteristics of the lithium secondary batteries prepared in Examples 1 and 2 of the present disclosure and Comparative Examples 1 and 2 according to cycles.

In this regard, FIG. 3 is a graph illustrating room-temperature life cycle characteristics of the lithium secondary batteries prepared in Examples 1 and 2 of the present disclosure and Comparative Examples 1 and 2 according to cycles at 4.35V. As illustrated in FIG. 3, it may be confirmed that the lithium secondary batteries according to Examples 1 and 2 had a capacity of about 95% in comparison to initial capacity when the charge and discharge cycle was repeated 80 times. However, with respect to the lithium secondary batteries according to Comparative Examples 1 and 2, it may be confirmed that capacities were lower than 95%. That is, it may be confirmed that the higher the electrical conductivities of the second positive electrode active materials, prepared in the form of pellets as in Comparative Examples 1 and 2, the lower the life cycle characteristics of the lithium secondary batteries. The reason for this is that the lower the charge resistance of the second positive electrode active material, the longer the single operating section of the second positive electrode active material at the early stage of the fast charging of the lithium secondary battery, and, as a result, the problem of the overload of the second positive electrode active material was intensified. Accordingly, it was confirmed that, as to Comparative Examples 1 and 2, the life cycle characteristics were degraded, and a side reaction of the electrolyte solution was increased, relative to Examples 1 and 2.

The invention claimed is:

1. A positive electrode material comprising:
   a first positive electrode active material represented by Formula 1; and
   a second positive electrode active material represented by Formula 2,
   wherein the second positive electrode active material has an electrical conductivity of 0.1 μS/cm to 150 μS/cm, which is measured after the second positive electrode active material is prepared in a form of a pellet by compressing the second positive electrode active material at a rolling load of 400 kgf to 2,000 kgf,
   wherein the first positive electrode active material and the second positive electrode active material are included in a weight ratio of 40:60 to 90:10,
   wherein the second positive electrode active material has a grain size of 200 nm to 500 nm, and wherein the operation starting voltage of the second positive electrode active material is 3.75 V or more:

$$LiCo_{1-a}M^1_aO_2 \qquad \text{[Formula 1]}$$

$$LiNi_bCo_cMn_dM^2_eO_2 \qquad \text{[Formula 2]}$$

wherein, in Formula 1, $M^1$ comprises at least one selected from the group consisting of aluminum (Al), titanium (Ti), magnesium (Mg), and zirconium (Zr), and $0<a\leq0.2$, and wherein, in Formula 2, $M^2$ comprises at least one selected from the group consisting of Al, Ti, Mg, Zr, yttrium (Y), strontium (Sr), and boron (B), and $0<b\leq0.6$, $0<c\leq0.35$, $0<d\leq0.35$, and $0<e\leq0.1$.

2. The positive electrode material of claim 1, wherein the first positive electrode active material has an average particle diameter ($D_{50}$) of 10 μm or more.

3. The positive electrode material of claim 1, wherein the second positive electrode active material has an average particle diameter ($D_{50}$) of 8 μm or less.

4. The positive electrode material of claim 1, wherein the second positive electrode active material comprises the doping element $M^2$ in an amount of 2,000 ppm to 10,000 ppm based on a total weight of the second positive electrode active material.

5. A method of preparing a positive electrode material, the method comprising:
preparing a first positive electrode active material represented by Formula 1 by mixing and sintering a cobalt oxide, a lithium-containing raw material, and a doping element $M^1$-containing raw material;
preparing a second positive electrode active material represented by Formula 2 by solid-phase mixing and sintering a nickel oxide, a cobalt oxide, a manganese oxide, a doping element $M^2$-containing raw material, and a lithium-containing raw material; and
mixing the first positive electrode active material and the second positive electrode active material, wherein the second positive electrode active material has an electrical conductivity of 0.1 μS/cm to 150 μS/cm, which is measured after the second positive electrode active material is prepared in a form of a pellet by compressing the second positive electrode active material at a rolling load of 400 kgf to 2,000 kgf, and wherein the operation starting voltage of the second positive electrode active material is 3.75 V or more:

$$LiCo_{1-a}M^1_aO_2 \qquad \text{[Formula 1]}$$

$$LiNi_bCo_cMn_dM^2_eO_2 \qquad \text{[Formula 2]}$$

wherein, in Formula 1, $M^1$ comprises at least one selected from the group consisting of aluminum (Al), titanium (Ti), magnesium (Mg), and zirconium (Zr), and $0\leq a\leq0.2$, and wherein, in Formula 2, $M^2$ comprises at least one selected from the group consisting of Al, Ti, Mg, Zr, yttrium (Y), strontium (Sr), and boron (B), and $0<b\leq0.6$, $0<c\leq0.35$, $0<d\leq0.35$, and $0<e\leq0.1$.

6. The method of claim 5, wherein, in the preparing of the second positive electrode active material, the solid-phase mixing is performed such that a molar ratio of nickel:cobalt:manganese:lithium:doping element $M^2$ is in a range of 40:30:30:104:2 to 60:20:20:100:0.

7. The method of claim 5, wherein the first positive electrode active material and the second positive electrode active material are mixed in a weight ratio of 40:60 to 90:10.

8. A positive electrode for a lithium secondary battery, the positive electrode comprising the positive electrode material of claim 1.

9. A lithium secondary battery comprising the positive electrode of claim 8.

10. The positive electrode material of claim 1, wherein the first positive electrode active material and the second positive electrode active material are included in a weight ratio of 50:50 to 80:20.

* * * * *